US009879331B2

(12) United States Patent
Bhoi et al.

(10) Patent No.: US 9,879,331 B2
(45) Date of Patent: Jan. 30, 2018

(54) GREEN PROCESS FOR THE PREPARATION OF PURE IRON

(71) Applicant: Council of Scientific and Industrial Research, New Delhi (IN)

(72) Inventors: Byagyadhar Bhoi, Bhubaneswar (IN); Barada Kanta Mishra, Bhubaneswar (IN); Raja Kishore Paramguru, Bhubaneswar (IN); Chinmaya Kumar Sarangi, Bhubaneswar (IN); Pravas Ranjan Behera, Bhubaneswar (IN); Priyanka Rajput, Bhubaneswar (IN); Partha Sarathi Mukherjee, Bhubaneswar (IN); Snigdha Priyadarshini, Bhubaneswar (IN)

(73) Assignee: Council of Scientific and Industrial Research, New Delhi (IN)

( * ) Notice: Subject to any disclaimer, the term of this patent is extended or adjusted under 35 U.S.C. 154(b) by 206 days.

(21) Appl. No.: 14/839,354

(22) Filed: Aug. 28, 2015

(65) Prior Publication Data
US 2016/0060726 A1    Mar. 3, 2016

(30) Foreign Application Priority Data
Aug. 29, 2014    (IN) .......................... 2464/DEL/2014

(51) Int. Cl.
*C21C 7/00*    (2006.01)
*C21B 15/02*    (2006.01)
(Continued)

(52) U.S. Cl.
CPC ............ *C21C 7/00* (2013.01); *C21B 13/0026* (2013.01); *C21B 13/125* (2013.01); *C21B 15/00* (2013.01); *C21B 15/02* (2013.01); *Y02P 10/136* (2015.11)

(58) Field of Classification Search
CPC .............................. C21B 13/125; C21B 15/02
See application file for complete search history.

(56) References Cited

U.S. PATENT DOCUMENTS 8,728,195 B2    5/2014    Bhoi et al.
2012/0132032 A1*    5/2012    Domke ..................... C22B 7/04
                                                    75/10.67

FOREIGN PATENT DOCUMENTS

RU        2358216 C2 *    6/2009

OTHER PUBLICATIONS

Hiebler et al. "Hydrogen Plasma Smelting Reduction—An Option for Steelmaking in the Future." Metalurgija 43(3) 2004. 155-162.*
(Continued)

*Primary Examiner* — George Wyszomierski
*Assistant Examiner* — Tima M McGuthry Banks
(74) *Attorney, Agent, or Firm* — Schwegman Lundberg & Woessner, P.A.

(57) ABSTRACT

The present invention relates to an eco-friendly and single step process for the preparation of high purity iron by using hydrogen plasma in a suitable smelting reactor furnace. Reduction of iron oxide in excess of 99% can be achieved by reducing the iron ore in hydrogen plasma smelting system. The product quality is greatly improved as there is no instance of coke inclusion which otherwise would have carried carbon, sulphur, phosphorous, silica, etc. with it. In addition, this greatly diminishes carbon dioxide emission thereby making the process highly eco-friendly in nature. Apart from these, the process produces water as the only by-product. The process takes care of the green house effect with the non-involvement of gases like carbon dioxide, carbon monoxide during the operation. Thus, the present process is developed to produce high pure iron in a hydrogen (Continued)

plasma reactor without using carbon as reductant which thereby reduces the carbon dioxide emission drastically.

8 Claims, 5 Drawing Sheets

(51) Int. Cl.
*C21B 13/00* (2006.01)
*C21B 13/12* (2006.01)
*C21B 15/00* (2006.01)

(56) References Cited

OTHER PUBLICATIONS

Machine Translation of RU 2358216 C2 (Vasilevich et al.), published Jun. 2009.*

Gilles, Herbert L., et al., "Reduction of Iron Ore With Hydrogen in a Direct Current Plasma Jet", *Ind. Eng. Chem. Process Des. Develop.*, 9(2), (1970), 194-207.

Hiebler, H., et al., "Hydrogen Plasma Smelting Reduction—An Option for Steelmaking in the Future", *Metalurgua*, 43, (2004), 155-162.

Kamiya, Koji, et al., "Reduction of Molten Iron Oxide and FeO Bearing Slags by $H_2$—Ar Plasma", *Transactions ISIJ*, vol. 24, (1984), 7-16.

Nakamura, Yasushi, et al., "Reduction and Dephosphorization of Molten Iron Oxide with Hydrogen-Argon Plasma", *Plasma Chemistry and Plasma Processing*, vol. 1, No. 2, (1981), 149-160.

Sjogren, Anker, et al., "Hydrogen Plasma Reactions in a D.C. Mode for the Conservation of Iron Meteorites and Antiquities", *Studies in Conservation*, vol. 36, No. 3, (Aug. 1991), 161-171.

Uchikoshi, Masahito, et al., "Production of semiconductor grade high-purity iron", *Thin Solid Films*, 461, (2004), 94-98.

* cited by examiner

GREEN PROCESS FOR THE PREPARATION OF PURE IRON

CLAIM OF PRIORITY

This application claims the benefit of priority of Indian Patent Application No. 2464/DEL/2014, filed on Aug. 29, 2014, the benefit of priority of which is claimed hereby, and which is incorporated by reference herein in its entirety.

FIELD OF THE INVENTION

The present invention relates to a green process for the preparation of high purity iron by reduction of iron ore using hydrogen plasma smelting reactor. Particularly, the present invention relates to a process for the preparation of high purity iron from iron ore with reduction of iron oxide in excess of 99%.

BACKGROUND OF THE INVENTION

The conventional route of producing iron in blast furnace from its oxides like $Fe_2O_3$ and $Fe_3O_4$ follows carbothermic reduction to yield pig iron (molten state) and oxide based slag like FeO, $Al_2O_3$, $SiO_2$, MgO, CaO, etc. The primary chemical reaction which produces molten iron can be represented as

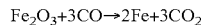

$$Fe_2O_3 + 3CO \rightarrow 2Fe + 3CO_2$$

During the process, preheated air is blown into the furnace which reacts with the carbon present in the form of coke to give rise to carbon monoxide and heat. The carbon monoxide produced reacts with oxide ore of iron to yield molten iron and carbon dioxide. While the original feed or raw materials are charged to reach the reaction zone, the by-product gases like unreacted carbon monoxide, hot carbon dioxide and nitrogen from the air travel upwards through the furnace.

There are numerous environmental woes that are directly related to the blast furnace operation. They are as follows:
1. With every ton of crude steel produced, about 1.9 ton of $CO_2$ is generated.
2. The atmosphere contains approximately 5% of $CO_2$ with steel industry as its major contributor.
3. There are other harmful gases like NOx and SOx which find their presence during blast furnace operation and coke making.
4. Solid wastes like slag affect the environment if they are not taken care of and disposed cost-effectively.

Giles and Clump [H. L. Gilles and C. W. Clump, *Ind. Eng. Chem. Process Dev.* 1970, 9, 194-207] conducted a detailed analysis of the iron ore reduction in a direct current plasma jet set-up. They arrived at the conclusion that the heat transfer occurred to the oxide particles is a determining factor to study the kinetics of the reduction process involved. Reduction of molten iron oxide and slags carrying FeO was reported by Kamiya et al. [K. Kamiya, N. Kithara, I. Morinaka, K. Sakuraya, M. Ozawa and M. Tanaka, *Trans. ISIJ* 1984, 24, 7-16.] in 1984 who indicated that the rate of removal of oxygen is very high (0.53 in $Fe_2O_3$ and 0.27 in slag containing FeO) in smelting reduction that involved $H_2$—Ar plasma. In order to produce high purity semiconductor grade Fe of more than 99.99% purity, Uchikoshi et al. [M. Uchikoshi, J. Imaizumi, H. Shibuya, T. Kekesi, K. Mimura and M. Isshki, *Thin Solid Films* 2004, 461, 94-98] conducted a process including hydrogen reduction and plasma arc melting in 2004. There was also a development of pilot scale industrial plant concept based on the laboratory experimental works by H. Hiebler and J. F. Plaul [H. Hiebler and J. F. Plaul, *Metallurgija* 2004, 43, 155-162] which clearly gives a positive signal towards adoption of hydrogen plasma smelting reduction (HPSR) for steel making with better product quality and flexibility. There are many other researchers like Sjogren et al. [A. Sjogren and V. F. Buchwald, *JSTOR: Studies on Conservation* 1991, 36, 161-171] (hydrogen plasma reaction in iron meteorites) and Nakamura et al. [Y. Nakamura, M. Ito and H. Ishikawa, *Plasma Chem. Plasma. Process.* 1981, 1, 149-160.] (reduction and dephosphorization of molten iron oxide with hydrogen-argon plasma) who reported the diverse aspects and advantages of reduction of iron oxide or ore in hydrogen plasma environment. The recent work by Bhoi et al. (U.S. Pat. No. 8,728,195) which also emphasized on the green process for preparation of Direct Reduced Iron (DRI) using hydrogen plasma generated in microwave. However, that route had some immediate drawbacks like difficulty in scaling up the process, low conversion of electric energy to thermal energy that attracted high power consumption costs.

As per the records, the reduction of iron oxide or ore in hydrogen medium was tried in the 1960's but due to its slow reaction kinetics beyond 900° C. the complete reduction consumed a time span of 3 days. As the plasma sources were basically meant for strategic applications those days, none could think about the fast reaction kinetics of hydrogen plasma and its importance in iron oxide reduction. In addition to this, the green house effect was not so intense due to the $CO_2$ emission from steel industries throughout the last quarter of twentieth century. The third reason is unavailability of perfect small and bench top models of plasmatrons and reactors which dwindled the opportunity to scrutinize different possibilities of hydrogen reduction of iron ores and other essential minerals. These are the governing reasons which stand by the fact that till date, the scope of effective utilization of hydrogen plasma in iron and steel sector is still in grooming stage and the innovative concepts are being restricted only to lab scale.

OBJECTIVES OF THE INVENTION

The main objective of the present invention is to provide a green process for the preparation of high purity iron by reduction of iron ore using hydrogen plasma smelting reactor.

Another objective of the present invention is to provide a process for the preparation of high purity iron without inclusion of any carbon source thereby making the process green.

Another objective of the present invention is to produce high purity iron containing Fe greater than 99.5%.

Another objective of the present invention is to use hydrogen in plasma form for reduction.

Yet another objective of the present invention is to use argon in combination with hydrogen at various ratios to generate plasma giving appropriate temperature for the reduction reaction.

Yet another objective of this process is to provide appropriate mechanism of magnetic stirring of the melt during the course of operation for improving productivity.

Another objective of this invention is to use hydrogen gas through lateral entry into the molten metal during the reaction to enhance productivity.

Another objective of this invention is to encourage carbon credit.

SUMMARY OF THE INVENTION

Accordingly, present invention provides a green process for the preparation of pure iron from iron oxide without using carbon, wherein the said process comprises the steps of:

a. mixing iron ore fines with 1 to 15% non-carbon additives to obtain iron oxide granules of size 0.2 to 6 mm as a feed material;
b. loading iron oxide granules as obtained in step (a) in water cooled copper crucible with options for feeding iron oxide granules with varying feed rate during the course of operation through a feeder;
c. introducing Ar gas at flow rate in the range of 5-50 liters per minute (lpm) into the reaction chamber for a period in the range of 1 to 2 minutes followed by establishing an electric arc to obtain molten iron ore;
d. passing $H_2$ gas at flow rate in the range of 2-40 lpm to the reaction chamber with magnetic stirring for a period in the range of 30-180 min to obtain slag and pure iron.

In an embodiment of the present invention, iron oxide granules are fed into the reaction chamber at the feed rate in the range of 100-600 g/hr.

In another embodiment of the present invention, the non-carbon additive used is bentonite.

In yet another embodiment of the present invention, slag as obtained in step (d) contains both magnetic fraction and non-magnetic fraction.

In yet another embodiment of the present invention, magnetic fraction is separated from the slag.

In yet another embodiment of the present invention, yield of pure iron as obtained in step (d) is in the range of 90-99% with purity in the range of 98.69 to 99.54%.

In yet another embodiment of the present invention, no carbon dioxide is produced.

In yet another embodiment of the present invention, iron ore fines can also be directly used instead of iron oxide granules.

In yet another embodiment of the present invention, water is obtained as the only by-product in step (d).

DETAILED DESCRIPTION OF THE INVENTION

Figure 1:
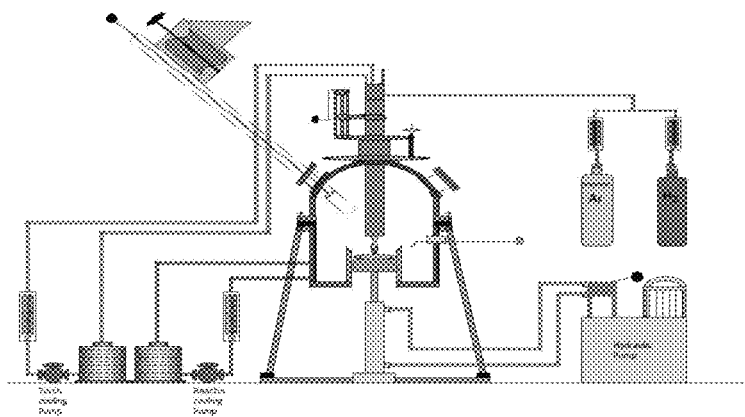
FIG. 1. Schematic of the Hydrogen Plasma Smelting Reactor
FIG. 2. XRD Analysis of Metal Samples
FIG. 3. XRD Analysis of Slag (Magnetic fraction)
FIG. 4. XRD Analysis of Slag (Non-magnetic Fraction)
FIG. 5. XRD Analysis of Metal Samples
FIG. 6. XRD Analysis of Slag (Magnetic fraction)
FIG. 7. XRD Analysis of Slag (Non-magnetic fraction)
FIG. 8. XRD Analysis of Metal
FIG. 9. XRD Analysis of Slag (Magnetic fraction)
FIG. 10. XRD Analysis of Slag (Non-magnetic fraction)

It is a widely known fact that blast furnaces are normally used to obtain molten iron from its oxides. There are some rigorous shortfalls concerning the following of blast furnace practice and most of them are related to energy consumption and environmental issues. The present inventors have found that hydrogen plasma smelting route for production of high pure iron not only discards any environmental issues arising out of carbon infringement but also it would adequately address the scarcity of high quality coal requirement in future. The technical aspects of this process is brighter too as it gives high pure iron at an excess of 99% and a reduction efficiency of 85%. Due to absence of any atmospheric contamination and energy friendly process (no preheating or processing of ores), this process is certainly here to stay.

Addressing adequately to the immense scope of utilization of hydrogen plasma in smelting reduction techniques, the current invention renders a green/eco-friendly route for the preparation high pure iron by reduction using high temperature hydrogen plasma.

The above process basically comprises of the following procedures.

a. loading of iron ore in the form of granules (0.2 to 6 mm size) into the copper crucible with an option varying feed rates during operation.
b. introducing Ar gas (5-50 lpm) into the reaction chamber in order to ensure an inert atmosphere and sustain plasma expansion.
c. establishing an electric arc between the plasma torch/electrode and copper crucible (bottom) to initiate plasma.
d. commencing of melting operation (1200-2000° C.) of iron ores due to the high heat/temperature generated by plasma.
e. introducing $H_2$ (2-40 lpm) to the reaction chamber to carry out reduction of iron oxides to pure iron.
f. collecting of iron samples after cooling to room temperature and analyzing metal and slag products for chemical and mineralogical contents.

The disclosure relates to smelting reduction of iron oxides by hydrogen in presence of thermal plasma. It should be noted here that hydrogen plasma plays a dual role, i.e. reductant as well as heat source. As the iron oxide reduction with the help of hydrogen is highly endothermic in nature, plasma supports the heat requirement very easily and it is befitting for the gas-stage reduction. When compared to the reaction that involves molecular hydrogen and iron oxide, the chemical driving force such as $\Delta G^0$ for hydrogen atom and hydrogen ion with iron oxide is recorded to be increased by 3 and 15 times respectively. Hence the standard free energy change is very low in case of hydrogen plasma and iron oxide compared to molecular hydrogen and iron oxide. It is therefore expected that the kinetics of reduction is quicker by an order of degree in hydrogen plasma. This is more evident in cases like the rate of oxygen removal in smelting reduction of iron oxide in carbon medium at 1600° C. is 0.064 g/cm²·min whereas it is nearly 0.53 g/cm²·min in plasma smelting reduction of iron oxide in hydrogen medium.

Further, the plasma reactor system with torch used for processing iron ore does not contain any graphite or carbonaceous materials which take part in reduction of iron ore, thereby giving the actual reduction done by hydrogen plasma. Whereas the conventional processes include graphite electrode which is likely to take part in reduction of iron ore, thereby misleading the actual reduction done by $H_2$ plasma. The present invention also consists of an electromagnetic stirring which makes the reduction efficient and faster, thereby reducing the total time of reduction.

Important advantages of the invention are highlighted below.
1. There is a good scope to significantly reduce the size of the reactor/furnace for a given throughput in case of continuous reactor operation.
2. Unlike the multiple unit operations like coke oven plant for treating coal, pelletization/sintering that are essentially needed in conventional iron making process, this plasma smelting would be a single stage operation.

3. It overcomes the intricacies of coke-making process which is basically energy-intensive in nature. Besides the addition of flux is less which takes care of the impurities like S, P, Si, Al etc. present in the molten metal through slag separation.

4. The product quality is greatly improved in case of hydrogen route, as there is no instance of coke inclusion which otherwise would have carried C and S with it. Eventually, the concentration of impurities like C, Si and S would be lower when compared to the molten iron generated through conventional blast furnace method.

5. The ore fines can be fed into the reactor operating on plasma but in case of conventional method, sintering is a must.

6. Since there is no presence of effluents like CO or $CO_2$, the scope of attracting carbon credit is quite apparent.

EXAMPLES

The following examples are given by way of illustration of the working of the invention in actual practice and should not be construed to limit the scope of the present invention in any way.

Example 1

Figure 2:
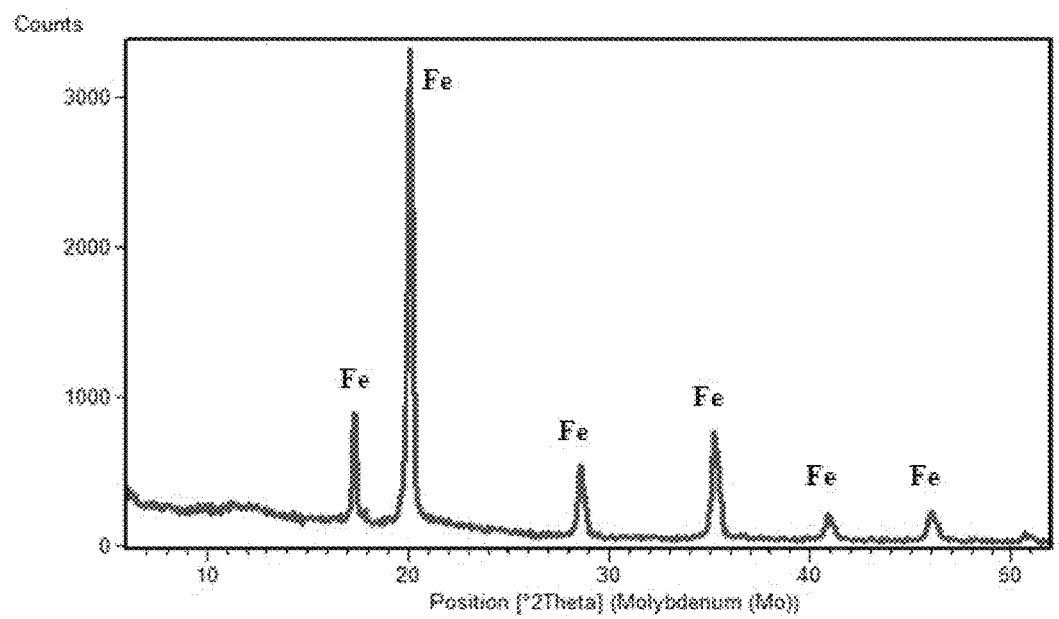
Figure 3:
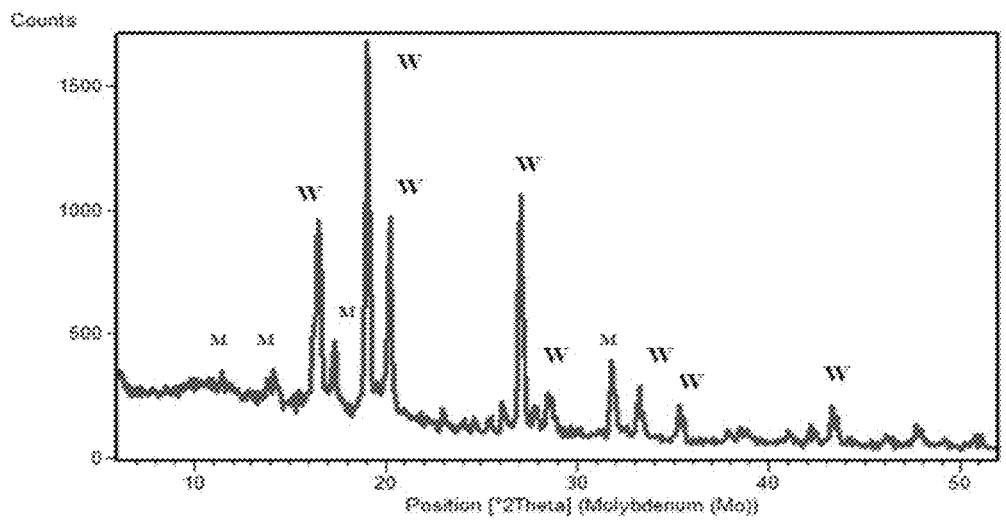
Figure 4:
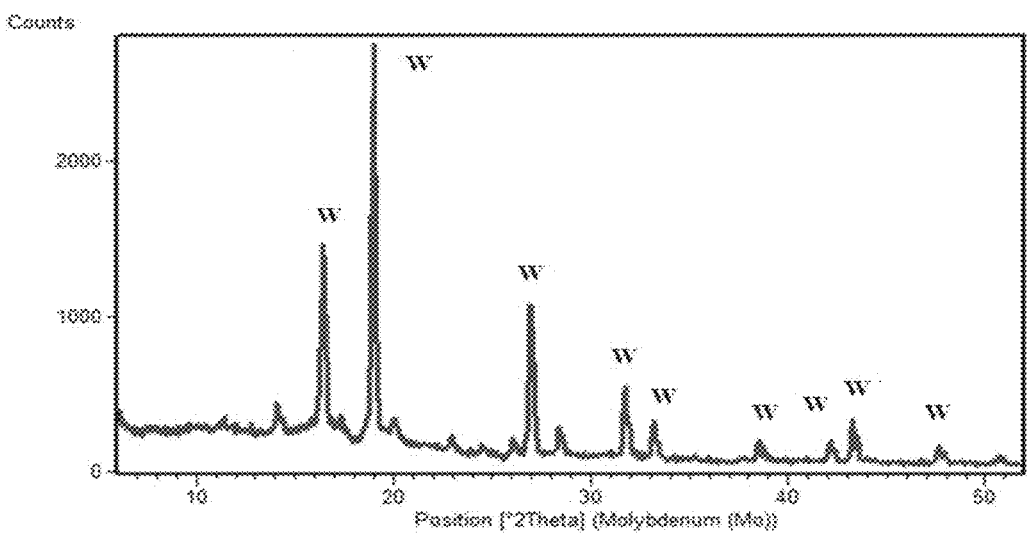

The reduction of iron oxide was carried out in a hydrogen plasma smelting reactor. The schematic diagram of the same has been shown in FIG. 1. The plasma was generated with the help of plasma torch and passing Ar gas through the centre of the torch. The melting of iron ores occurred in the water cooled copper crucible of the reactor due to the high heat (2000° C.) generated by plasma. Subsequently $H_2$ gas was passed through the nozzle of the torch which acted as the reductant to reduce molten iron from its oxides. A typical experimental campaign consists of loading 50 g of iron ore/oxide sample (1-6 mm size granules) along with 1% of Bentonite as binder initially into the water cooled copper crucible and getting the reactor ready for the operation. The arc was checked to ignite plasma into the reaction chamber with the help of Ar gas that is passed through the centre of the plasma torch. After passing the Ar gas at 10 lpm to the chamber for 1 minute, the iron ore present in the water cooled copper crucible was melted. During that time, $H_2$ gas was passed through the nozzle of the plasma torch at the flow rate of 5 lpm along with Ar gas to start up the reduction process of iron ores/oxides. The power supply was maintained around 10 kW to facilitate the melting and reduction process simultaneously. During the course, other 3 batches (50 g each) of iron ore samples were fed into the reaction chamber through the feeder to ensure complete melting and reduction of 200 g iron ore. While carrying out the reduction process, the plasma torch was positioned at different angles (XxYxZ directions) to ensure uniformity in the reduction of iron ores. The plasma torch was also made to rotate at its own axis as and when required. To support better agitation of the molten metal with hydrogen, the electromagnetic stirrer was attached to the bottom of the water cooled copper crucible. After the reduction was observed for complete 50 mins, the molten iron was brought down to room temperature. The iron sample was then sent for carrying out chemical as well as mineralogical characterizations (FIGS. 2, 3 and 4). The metal and slag products were separated. The slag sample was ground to 0.2 mm (200 micron) size and subjected to magnetic separation. The metal and the slag analysis details are given in Table 2, 3 and 4, respectively. The purity of iron achieved is 98.69%.

The chemical analysis of the iron ore is given in Table 1.

TABLE 1

Chemical Analysis of the Iron Ore

| | Compound | | | | |
|---|---|---|---|---|---|
| | $Fe_2O_3$ | $Al_2O_3$ | $SiO_2$ | MgO | CaO |
| Percentage, % | 84.6 | 1.62 | 12.11 | 0.57 | 0.36 |

The experimental conditions followed are illustrated below

1. Power: 10 kW
2. Ar gas flow: 10 lpm
3. $H_2$ gas flow: 5 lpm
4. Temperature: 2000° C. (approx.)
5. Time: 50 min
6. Sample wt: 200 g The chemical analysis of the metal and slag is given below.

TABLE 2

Chemical Analysis of Metal

| Feed | Metal | | | | | |
|---|---|---|---|---|---|---|
| (g) | Fe (%) | Si (%) | Al (%) | P (%) | C (%) | S (%) |
| 200 | 98.69 | 0.151 | 0.023 | 0.017 | 0.067 | 0.049 |

TABLE 3

Chemical Analysis of Slag (Magnetic fraction)

| Feed | Magnetic Fraction of the Slag | | | | | |
|---|---|---|---|---|---|---|
| (g) | Fe (T) % | Fe (M) % | FeO | CaO | $SiO_2$ | $Al_2O_3$ |
| 200 | 75.04 | 10.47 | 78.29 | 0.20 | 0.91 | 1.13 |

TABLE 4

Chemical Analysis of Slag (Non-magnetic fraction)

| Feed | Non-magnetic Fraction of the Slag | | | | | | |
|---|---|---|---|---|---|---|---|
| (g) | Fe (T) % | Fe (M) % | FeO | CaO | $SiO_2$ | $Al_2O_3$ | MgO |
| 200 | 72.16 | 1.13 | 83.95 | 0.295 | 1.96 | 1.59 | 0.080 |

Example 2

Figure 5:
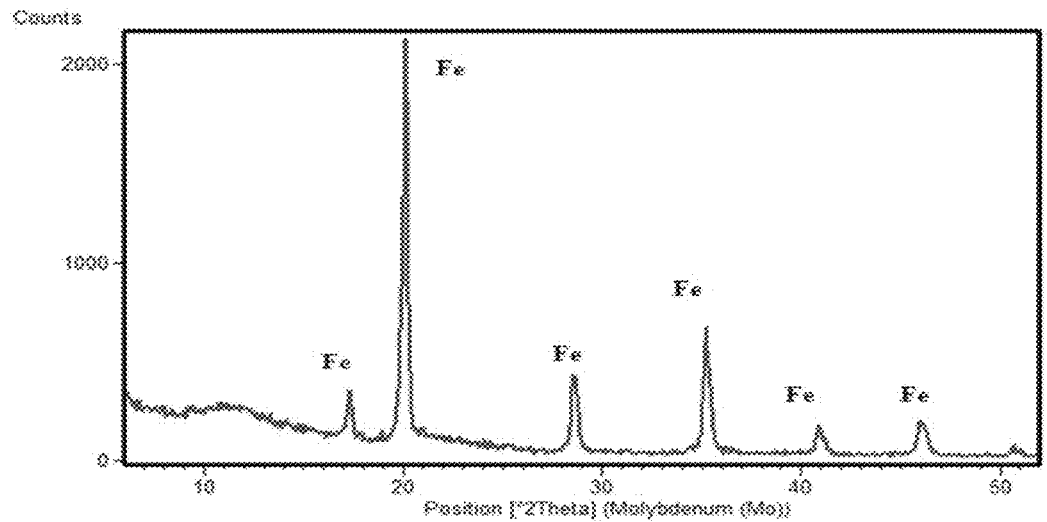
Figure 6:
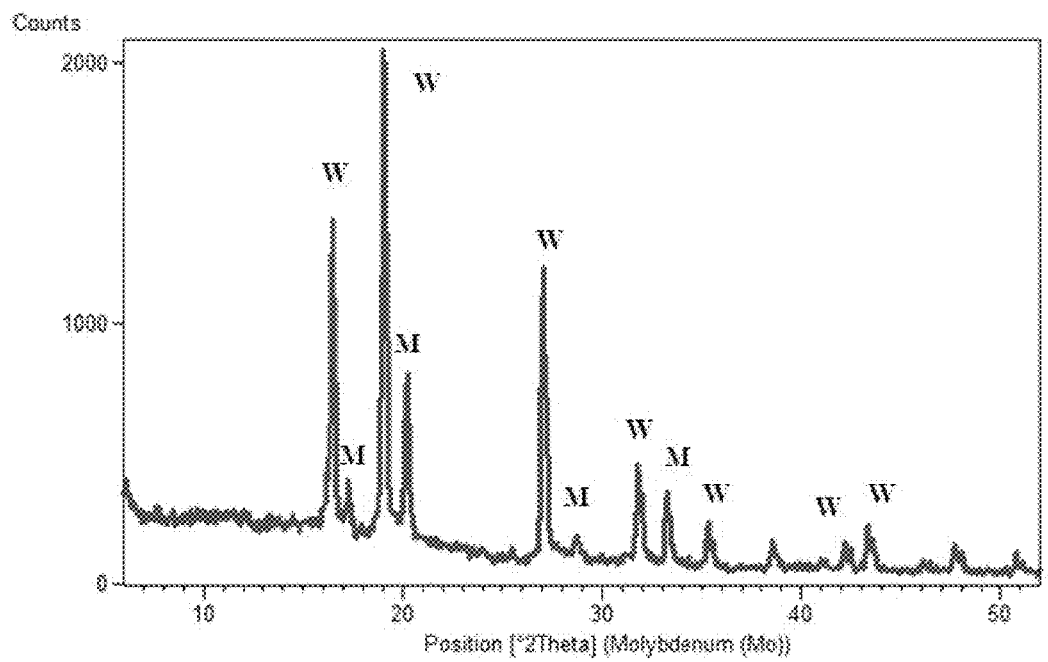
Figure 7:
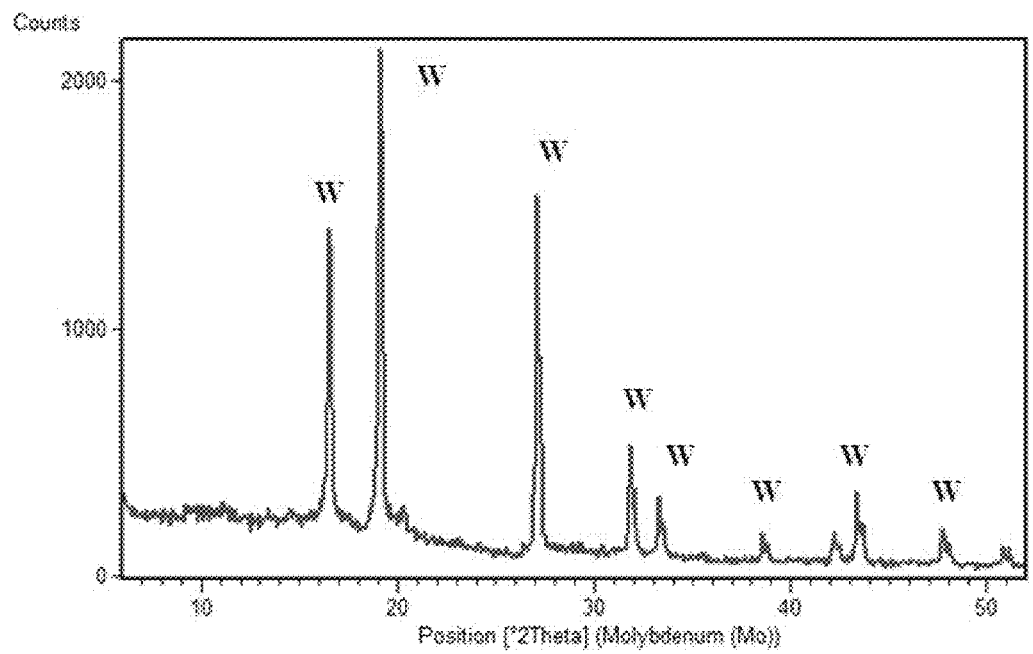

The reduction of iron oxide/ore was carried out in the hydrogen plasma smelting reactor for 400 g scale. Initially, 50 g of the iron ore or oxide sample in the form of granules (1-6 mm size) along with 1% of bentonite as binder were loaded onto the water cooled copper crucible. The remaining 350 g of iron ore samples were fed into the reactor during the course of operation in batches (50 g each). Before the reduction was conducted with the help of hydrogen gas as the reducing agent, the reaction chamber was made inert with the supply for Ar gas from the centre of the plasma torch. Then, the ignition was done due to the established arc between plasma torch and copper crucible at the bottom. As Ar gas helped to expand plasma and melt the iron ore, the hydrogen gas was passed through the nozzle of the plasma torch to take care of the reduction of molten iron from its oxide ore. The positioning of the plasma torch was varied as per the requirement to maintain uniformity in the reduction process and the electromagnetic induction couple which was placed under the water cooled copper crucible helped to stir the molten metal to enhance further reduction of the oxides. After the reduction was carried out for 90 mins, the molten metal sample was cooled down to room temperature and subsequent chemical analysis and mineralogical characterization (FIGS. 5, 6 and 7) was conducted. Furthermore, the metal and slag parts were separated. The slag was ground to 0.2 mm (200 micron) size and exposed to magnetic separation. The details of the metal and slag analysis are given in Table 5, 6, 7 respectively. The purity of iron achieved is 99.54%.

The experimental conditions followed are highlighted below.
1. Power: 12 kW
2. Ar gas flow: 10 lpm
3. $H_2$ gas flow: 5 lpm
4. Temperature: 2000° C. (approx.)
5. Time: 95 min
6. Sample wt: 400 g The chemical analysis of the metal and slag is given below.

TABLE 5

Chemical Analysis of Metal

| Feed | Metal | | | | | |
|---|---|---|---|---|---|---|
| (g) | Fe (%) | Si (%) | Al (%) | P (%) | C (%) | S (%) |
| 400 | 99.54 | 0.083 | 0.026 | 0.010 | 0.074 | 0.051 |

TABLE 6

Chemical Analysis of Slag (Magnetic fraction)

| Feed | Magnetic Fraction of the Slag | | | | | |
|---|---|---|---|---|---|---|
| (g) | Fe (T) | Fe (M) | FeO | CaO | $SiO_2$ | $Al_2O_3$ |
| 400 | 78.87 | 15.61 | 75.28 | 0.26 | 0.78 | 0.67 |

TABLE 7

Chemical Analysis of Slag (Non-magnetic fraction)

| Feed | Non-magnetic Fraction of the Slag | | | | | | |
|---|---|---|---|---|---|---|---|
| (g) | Fe (T) % | Fe (M) % | FeO | CaO | $SiO_2$ | $Al_2O_3$ | MgO |
| 400 | 72.59 | 0.83 | 84.62 | 0.289 | 1.67 | 1.02 | 0.134 |

Example 3

Figure 8:
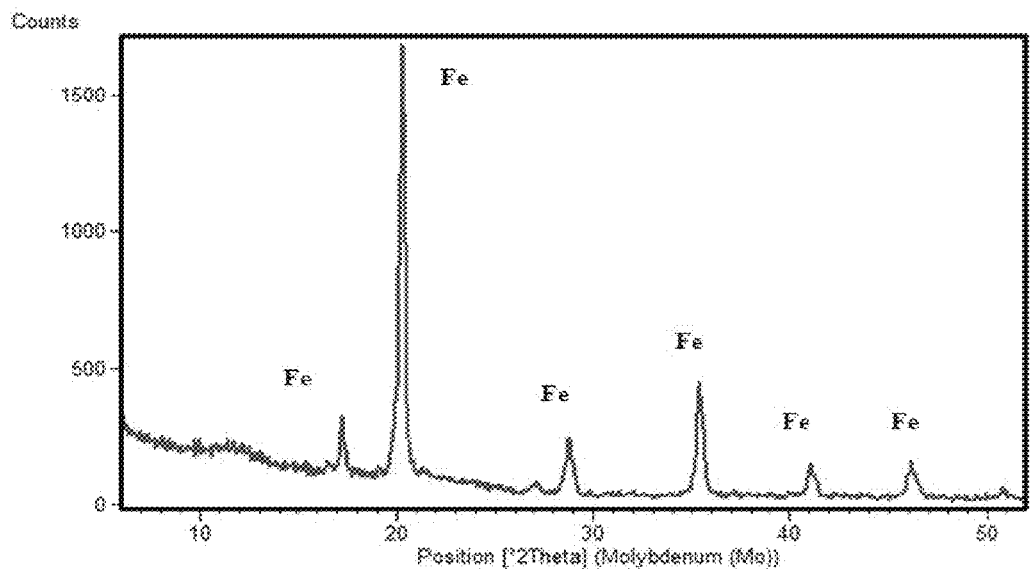
Figure 9:
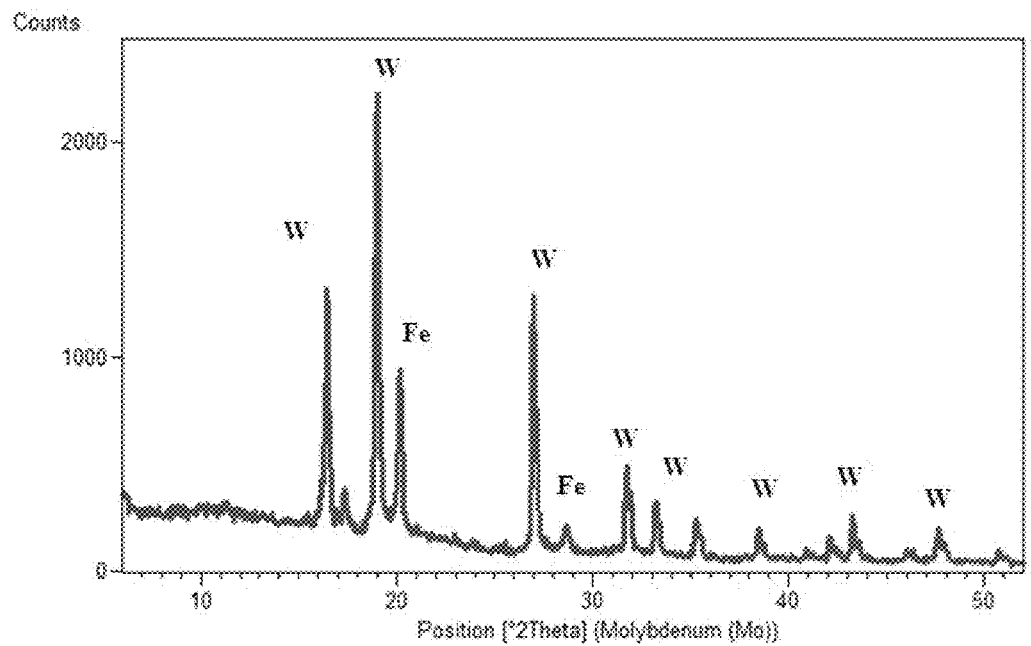
Figure 10:
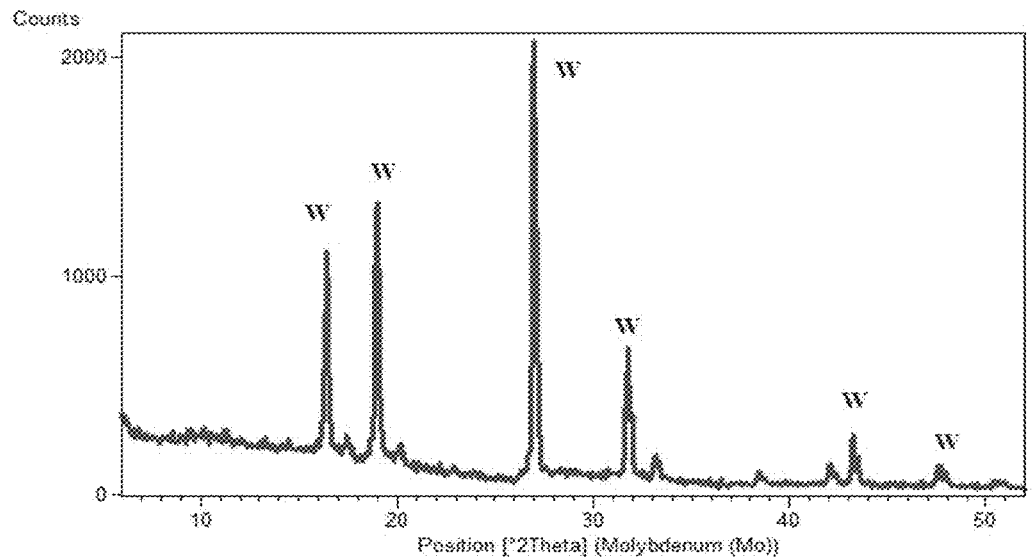

The reduction of iron oxide/ore was conducted in the hydrogen plasma smelting reactor for 600 g scale. In the beginning, 50 g of iron ore or oxide sample in the form of granules (0.2 mm of size) along with 1% of bentonite as binder were placed in the water cooled copper crucible of the reaction chamber. The remaining 550 g of ore samples were charged into the reactor chamber through the feeder as the operation continued. After the Ar gas (10 lpm) was passed through the centre of the plasma torch to the reaction chamber for 1 min, the ignition was initiated with the help of the electric arc that was established between the plasma torch and water cooled copper crucible at the bottom. When the metal ore started to melt due to the high temperature (2000° C.) generated by plasma, hydrogen gas was passed through the torch nozzle which reduced the molten metal from its oxide ores. The uniformity in reduction was attained with the help of changing positions of the plasma torch and electromagnetic stirring that occurred due to the induction coil placed at the bottom of the water cooled copper crucible. The reduction reaction was continued for complete 140 mins after which the molten iron samples were brought down to room temperature. The chemical analysis and mineralogical characterization (FIGS. 8, 9 and 10) were carried out. The slag was made finer to 02 mm size and it was subjected to magnetic separation. The analysis details of the metal and slag are shown in Table 8, 9, 10 respectively. The purity of iron achieved is 99.24%.

The experimental conditions followed are highlighted below.
1. Power: 10-12 kW
2. Ar gas flow: 10 lpm
3. $H_2$ gas flow: 5 lpm
4. Temperature: 2000° C. (approx.)
5. Time: 140 min
6. Sample wt: 600 g The chemical analysis of the metal and slag is highlighted below.

TABLE 8

Chemical Analysis of Metal

| Feed | Metal | | | | | |
|---|---|---|---|---|---|---|
| (g) | Fe (%) | Si (%) | Al (%) | P (%) | C (%) | S (%) |
| 600 | 99.24 | 0.112 | 0.016 | 0.012 | 0.058 | 0.049 |

TABLE 9

Chemical Analysis of Slag (Magnetic fraction)

| Feed | Magnetic Fraction of the Slag | | | | | |
|---|---|---|---|---|---|---|
| (g) | Fe (T) % | Fe (M) % | FeO | CaO | $SiO_2$ | $Al_2O_3$ |
| 600 | 77.29 | 10.76 | 81.50 | 0.19 | 0.73 | 0.73 |

TABLE 10

Chemical Analysis of Slag (Non-magnetic fraction)
Comparative Example

| Exp No. | Scale (g) | Vdc (V) | Idc (A) | $H_2$ flow (lpm) | Ar flow (lpm) | Time (min) | Metal (g) | Yield (%) |
|---|---|---|---|---|---|---|---|---|
| A (without electro-magnetic stirring) | 200 | 98 | 56 | 15 | 15 | 36 | 38 | 45.13 |

TABLE 10-continued

Chemical Analysis of Slag (Non-magnetic fraction)
Comparative Example

| Exp No. | Scale (g) | Vdc (V) | Idc (A) | $H_2$ flow (lpm) | Ar flow (lpm) | Time (min) | Metal (g) | Yield (%) |
|---|---|---|---|---|---|---|---|---|
| B (With electro-magnetic stirring) | 200 | 98 | 132 | 15 | 15 | 25 | 56 | 63.42 |

TABLE 11

Effect of Electro-magnetic stirring on Reduction Efficiency

| Feed (g) | Non-magnetic Fraction of the Slag | | | | | | |
|---|---|---|---|---|---|---|---|
| | Fe (T) % | Fe (M) % | FeO | CaO | $SiO_2$ | $Al_2O_3$ | MgO |
| 600 | 71.90 | 1.11 | 81.75 | 0.382 | 2.85 | 1.11 | 0.145 |

ADVANTAGES OF THE INVENTION

1. A green process has been developed to extract pure iron from its oxide ores that is eco-friendly as well as energy saving in nature.
2. The current invention involves a single major process to reduce high pure iron from its ores eliminating the needs of several unit operations like pelletization, sintering, ore-processing, etc.
3. The process not only takes care of the environment but also holds a good scope to address the deficiency of coal resources in upcoming times.
4. The process takes care of the green house effect aptly with the non-involvement of green house gases like carbon dioxide and carbon monoxide during or after the operation.
5. The product quality is high pure due to the absence of carbon and sulphur which would otherwise have got entrapped in the metal through the use of coal.
6. The troubles posed by hefty reactor designing and handling are best eliminated in this process of extraction of high pure iron from its oxide ores.
7. The absence of effluents like $CO/CO_2$ would attract carbon credit.

What is claimed is:

1. A green process for the preparation of pure iron from iron oxide without using carbon, wherein the said process comprises the steps of:
    a) mixing iron ore fines with 1 to 15% by weight non-carbon additives to obtain iron oxide granules of size 0.2 to 6 mm as a feed material;
    b) loading iron oxide granules as obtained in step a) in water cooled copper crucible with options for feeding iron oxide granules with varying feed rate during the course of operation through a feeder;
    c) introducing Ar gas at flow rate in the range of 5-50 liters per minute (1 pm) into the reaction chamber for a period in the range of 1 to 2 minutes followed by establishing an electric arc to obtain molten iron ore; and
    d) passing $H_2$ gas at flow rate in the range of 2-40 lpm to the reaction chamber with magnetic stirring for a period in the range of 30-180 min to obtain slag and pure iron.

2. The process according to the claim 1, wherein iron oxide granules are fed into the reaction chamber at the feed rate in the range of 100-600 g/hr.

3. The process according to the claim 1, wherein the non-carbon additive used is bentonite.

4. The process according to the claim 1, wherein slag as obtained in step d) contains both magnetic fraction and non-magnetic fraction.

5. The process according to the claim 4, wherein magnetic fraction is separated from the slag.

6. The process according to the claim 1, wherein pure iron yield as obtained in step d) is in the range of 90-99% with purity in the range of 98.69 to 99.54% by weight.

7. The process according to the claim 1, wherein no carbon dioxide is produced.

8. The process according to the claim 1, wherein water is obtained as the only by-product in step d).

* * * * *